United States Patent [19]

Johnson

[11] Patent Number: 4,980,183

[45] Date of Patent: Dec. 25, 1990

[54] METHOD FOR PREPARING WHOLE DEVILED EGGS

[76] Inventor: Nancy C. Johnson, 2427 Mark Dr., Mesquite, Tex. 75150

[21] Appl. No.: 506,675

[22] Filed: Apr. 9, 1990

Related U.S. Application Data

[63] Continuation-in-part of Ser. No. 349,597, May 9, 1989, Pat. No. 4,934,053.

[51] Int. Cl.$^5$ ............................................... A23J 1/00
[52] U.S. Cl. .................................... 426/299; 426/479
[58] Field of Search ............... 426/298, 299, 479, 510; 30/120.1, 124, 135

[56] References Cited

U.S. PATENT DOCUMENTS 3,764,714  10/1973  Driggs ................................. 426/299
4,308,290  12/1981  Fujii ..................................... 426/299

*Primary Examiner*—George Yeung
*Attorney, Agent, or Firm*—Johnson & Gibbs

[57] ABSTRACT

A method and apparatus for preparing a plurality of whole deviled eggs. The eggs are first oriented and stored collectively in a refrigerated area for a prolonged period of time in order to cause the egg yolk to float to a select side of each egg. The eggs are preferably oriented within a container turned upon its side to cause the sides of each egg to face upwardly. An egg carton is but one example. In this manner the egg yolks rise against the upward facing side. The oriented eggs are then steamed in a specialized platter to facilitate the hard cooking of the egg white in the preselected position. The egg yolk is then removed from the peeled egg through the thin portion of egg white exposed thereon. A whole deviled egg is then prepared by removing the egg yolk and stuffing the remaining whole egg with a preselect mix. The specialized platter is then used as a serving tray, wherein the bottom of each egg is flattened to prevent the egg from easily rolling over in the user's plate.

7 Claims, 2 Drawing Sheets

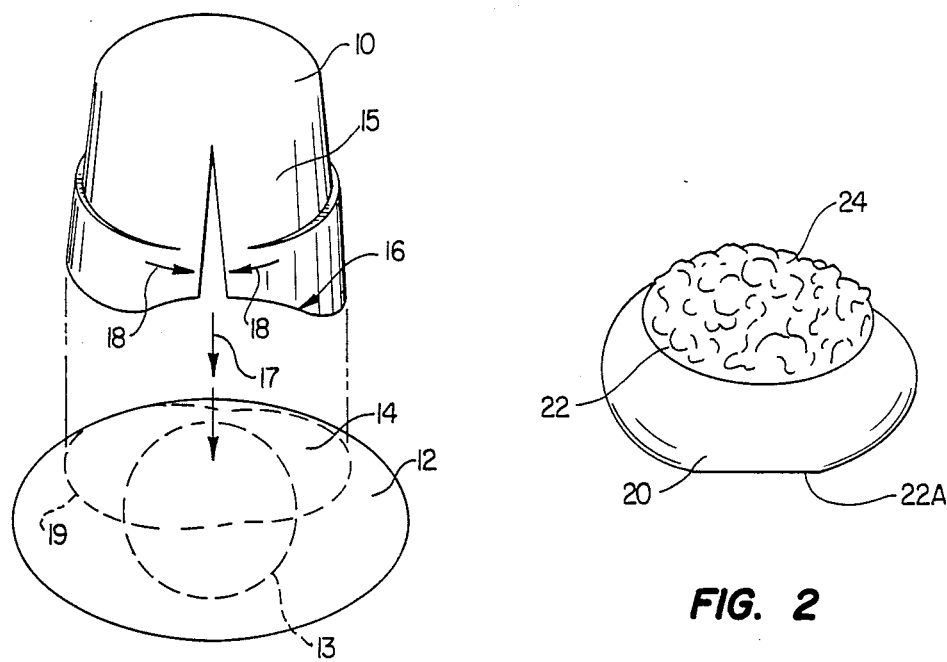
FIG. 1
FIG. 2
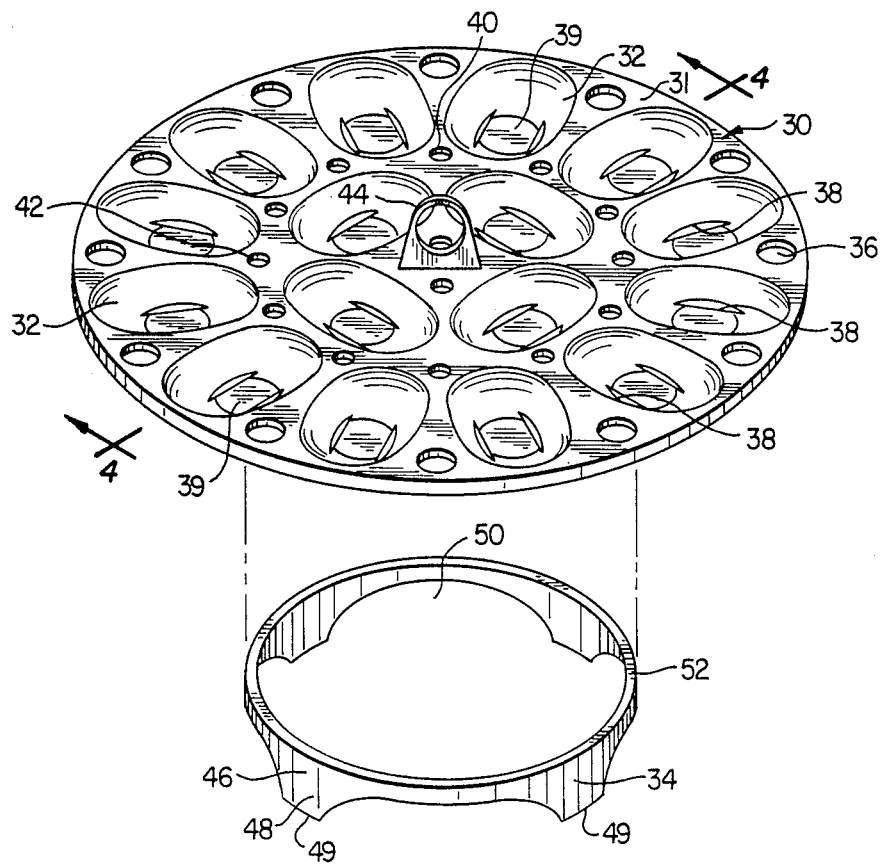
FIG. 3

METHOD FOR PREPARING WHOLE DEVILED EGGS

BACKGROUND OF THE INVENTION

Related Application

The present application is a continuation-in-part of U.S. patent application Ser. No. 07/349,597 filed May 9, 1989 by the inventor of the present application, now U.S. Pat. No. 4,934,053.

FIELD OF THE INVENTION

The present invention relates to the preparation of whole deviled eggs and, more particularly, to the method of and apparatus for the preparation of a plurality of whole deviled eggs and the serving thereof.

HISTORY OF THE PRIOR ART

As stated in the above referenced patent application of which the present application is a continuation-in-part, the prior art is replete with culinary implements adapted for facilitating the preparation of food as well as the enjoyment thereof. Many culinary implements have, however, manifested only slight change throughout the decades. For example, conventional silverware configurations have varied only slightly and many of these variations are attributable to advances in metallurgy. The most noticeable advance in culinary implements is the result of the application of higher technology, e.g. motorizing kitchen utensils. Blenders, mixers, processors and choppers have found widespread application in the preparation of food. In many instances the food preparation is for both aesthetic as well as functional or nutritional benefit.

More basic advances in the prior art include the development of apparatus having, as its sole function, a particular application for culinary items. The cork screw for example was necessitated by the widespread use of water tight corks and in the late 1700's a model was developed with a moving screw and fixed collar which found widespread popularity. Such prior art also includes the development of the modern fork, the distant precursors of which had been dated as far back as the sixth millennium B.C. Such utensils found widespread popularity in the 1300's and 1400's. Such culinary implements were, however, a symbol of luxury and only came into general use at the close of the eighteenth century. It was, in fact, not until this time that individual plates and glasses found themselves in general use by the general public. Prior to this time communal dishes or caldrons were used by both family and guests. It may be seen that culinary implements as well as certain cuisine, though considered a symbol of refinement for the wealthy, have over the centuries found themselves applicable to everyday dinner and public consumption. For this reason culinary implements particularly adapted for the preparation of certain foods play an important role in the development of dining habits. Certain foods such as hors d'oeuvres considered separate from conventional dining and dietary consideration can ultimately become more popular once the preparation thereof has been simplified by such developments.

The preparation of food stuff with culinary implements particularly adapted for a specific operation is represented in some instances by U.S. patent references. For example, U.S. Pat. No. 359,950 was issued to Wilcox in 1887 for facilitating the removal of kernels of corn. This implement was comprised of a bifurcated blade assembly of arcuate design. The blades were disposed in generally parallel spaced relationship to thereby form a generally circumferential cutting surface of bifurcated design. The elongate shape of the implement permitted its resilient engagement with an ear of corn in axial alignment therewith. The resiliency imparted a biased cutting pressure to the ear of corn whereby axial and/or rotational movement of the implement relative to the ear of corn would cause the removal of the kernels therefrom. This particular culinary application has obviously found widespread utility as more advanced assemblages have been provided in more recent years. Today corn is provided as a food stuff in both configurations on the ear and removed therefrom. Only by the advances in cutting technology, however, is the widespread availability for such food items made possible.

U.S. Pat. No. 2,726,440 is a 1955 patent teaching an improved means for cutting the meat from grapefruit and the like. In this particular application, a generally cylindrical shaped cutter was particularly adapted for engaging, flexing and cutting the meat of a grapefruit for the convenience of the user. The novelty found therein apparently resided in the utilization of the generally cylindrical, flexible cutting blades that were themselves separated in space one from the other for affording ease and flexibility during engagement with the particular food item. Both the size, shape and the material characteristics were particularly adapted for the application so desired. By utilization of this particular culinary implement advances were made possible in food preparation.

U.S. Pat. No. 2,549,008 issued to Rasaka in 1951 is yet another advance in food preparation made possible by a culinary implement. In this patent reference a coring implement is constructed with a depth gauge. Fruits and vegetables can therein be prepared in a more efficient manner. Were it not for such tools of the culinary trade, many of todays finer dishes would not be so readily available. Likewise, many of the foods themselves are the result of some manifestation of inventive genius.

Take for example the crescent roll. Invented in the seventeenth century in Vienna, the crescent roll represents both a time and a place. The city had been under siege by the Turks who had been defeated. It is said that a Polish entrepreneur had a baker make small milk bread rolls in the shape of crescents to commemorate the victory over the Turks to be sold with coffee at his cafe. They were immediately successful. Similarly, cream filled bread rolls originated as a delicacy but due to the development of specialized culinary implements are more common today. For example, one culinary implement particularly adapted for the making of stuffed bread rolls is set forth and shown in U.S. Pat. No. 4,507,866 issued to Rimmeir. This 1985 reference teaches yet another device for enhancing the ease with which an individual may prepare food. This culinary implement is particularly adapted for removing the center region of a bread roll for replacing said region with a select filling. The utensil is particularly constructed for this single operation as well as for enhancing the efficiency in food preparation. The construction of the device is particularly adapted for bread wherein the cutting end of the culinary implement is of sinuous construction. A pair of arcuate serrated regions are therein permitted to engage the bread and by select motion remove said center region thereof. In this manner the bread is embedded within the implement itself. A separate aspect of the implement is the means for removing the bread therefrom.

It may be seen that the prior art is replete with apparatus for specific culinary use. None of these deviled address the particular application of preparing deviled eggs from hard boiled eggs. Deviled eggs are the result of careful culinary preparation and may vary in composition and design. For example, the mixture of hard boiled egg yolk and other ingredients will vary from recipe to recipe. What does not vary in conventional prior art recipes for deviled eggs is the utilization of one-half of the egg for each deviled egg serving. This requires that the egg be evenly cut in two and the portion thereof is substantially reduced in size. The preparation of a deviled egg from the whole egg is generally not possible due to the difficulty in properly preparing the egg such as in removing the hard boiled egg yolk from the egg with conventional culinary implements. Yet, a deviled egg made from the whole egg would be aesthetically pleasing and considerably easier to handle as a finger food. With the curvature thereof left intact, it would be both an aesthetic advance over the prior art as well as a functional advance in the preparation of such hors d'oeuvres. The present invention addresses such a need by providing a method and apparatus particularly adapted for handling, storing, preparing and serving whole eggs and removing a select portion of the hard boiled egg white so that the yolk can be easily removed.

SUMMARY OF THE INVENTION

The present invention relates to the preparation of a plurality of whole deviled eggs. More particularly, the present invention includes a method of preparing a tray of whole deviled eggs by removing a section of egg white through the penetration of a solidified white section of the egg to expose a prepositioned egg yolk therewithin. The method comprises the steps of orienting the eggs on their sides and storing the oriented eggs in a refrigerated area for a sufficient period of time to facilitate egg yolk positioning on a single side. A cutting implement is provided for the select penetration of the egg and the exposure of the egg yolk therein. The implement is formed with arcuate, bifurcated side wall portions, which are provided in a generally arcuate cross sectional configuration with a lower cutting edge formed thereacross and adapted for engaging and penetrating the white of the egg. The eggs may be heated by steaming in a specialized processing and serving tray for solidifying the white section and the egg yolks therein. This step facilitates the removal of the egg yolks therefrom after removing the egg shells from the eggs. The eggs are placed in positions to expose the thin egg white sides and the egg yolks therein. The arcuately shaped cutting section of the cutting implement is positioned upon select surfaces of the eggs and pressed into the eggs. Flexing the bifurcated sections of the implement one toward the other permits the penetrated egg white of each egg to be engaged and retracted from the egg. The egg yolks can then be removed for subsequent refilling of the eggs with a mixture for comprising whole deviled eggs.

BRIEF DESCRIPTION OF THE DRAWINGS

For a more complete understanding of the present invention and for further objects and advantages thereof, reference may now be had to the following description taken in conjunction with the accompanying drawings and which:

FIG. 1 is a perspective view of the culinary implement of the present invention positioned above a hard boiled egg for the purpose of creating a hollow and removing the egg yolk therefrom;

FIG. 2 is a perspective view of a hard boiled egg having the egg yolk removed therefrom and preparing it into a deviled egg comprising the whole hard boiled egg;

FIG. 3 is an exploded perspective view of a whole deviled egg processing tray constructed in accordance with the principles of the present invention;

DETAILED DESCRIPTION

Figure 4:
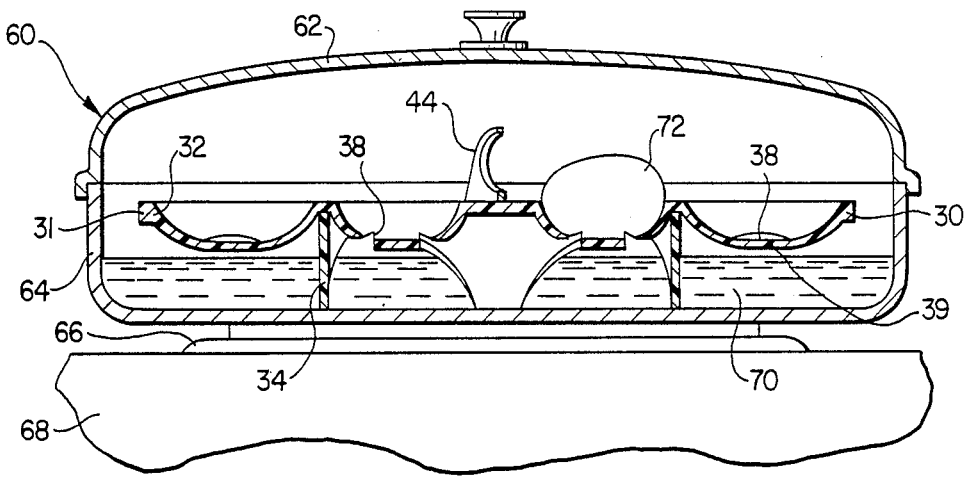
FIG. 4 is a side elevational, cross-sectional view of the processing tray of FIG. 3 shown disposed within a cooking vessel.

Referring first to FIG. 1, there is shown a perspective view of the culinary implement 10 of the present invention poised on top of the hard boiled egg 12 in a position for removing a portion of the egg white and the egg yolk 13 therefrom. Implement 10 comprises a bifurcated shell 15. The bifurcated shell sections are preferably made of plastic and both terminate across a bottom cutting region 16. The shell 15 flexes to permit the appropriate cutting action as most clearly set forth and shown in co-pending patent application Ser. No. 07/349,597 filed on May 9, 1989, of which the present application is a continuation-in-part.

With the present construction, the shell 15 may be pressed downwardly in the direction of arrows 17 into engagement with the surface of the egg 12 forming a cutting line therearound as shown by phantom line 19. Once the shell 15 has penetrated the surface of the egg 12, it is squeezed wherein the flexing occurs in the direction of oppositely drawn arrows 18. The aforesaid flexing may be the result of simple pressing of the bifurcated shell 15 by the user to remove the egg white and expose the egg yolk 13 for removal. In this manner a whole hard boiled egg is prepared for receipt of deviled egg mix and the hors d'oeuvres in a configuration not generally possible with prior art culinary techniques.

Referring now to FIG. 2 there is shown a deviled egg 20 prepared in accordance with the principles of the present invention. The whole egg 20 is utilized for the preparation of the deviled egg whereby the top portion 22 represents the cut portion formed by the implement 10. A deviled egg mix of conventional recipe is shown protruding therefrom in mound 24. This particular configuration represents a novel hors d'oeuvres creation made possible by the particular application of the culinary implement 10 of the present invention. The preparation of such a deviled egg 20 does, however, present certain other associated considerations such as preparation, storage, transportation and serving. In accordance therewith, another aspect of the present invention provides a processing and serving tray assembly specifically adapted for whole deviled eggs prepared in accordance with the principles of the present invention. The tray provides means for flattening the bottom 22A of the prepared egg 20, as described in more detail below.

Referring now to FIG. 3, there is shown a processing and serving tray 30 comprising a circular tray body 31 having a plurality of depressions, or indentations 32 formed therein. Each indentation 32 is adapted for the receipt of a whole egg and its stable positioning therein. A stand 34 is constructed for matingly engaging the underneath side of the tray 30 in support thereof and as described in more detail below. This particular tray is adapted for both steam processing the eggs and serving them. From the standpoint of steaming, a plurality of large circular apertures are formed along the outer perimeter of the circular body member 31. Each indention 32 also includes a plurality of slits or apertures 38 for permitting steam to rise therein. The slits 38 are formed on opposite sides of a generally planar base section 39 formed at the base of each indentation 32. The planar base 32 is designed to mold and flatten the bottom of a prepared egg when the tray 30 is used for serving. Because of the shape of the whole deviled egg, it is important to have a flattened egg bottom in order to prevent it from rolling over on the user's plate. Referring back to the preparing mode, a circular ring of smaller apertures 40 is disposed inwardly of the outer row of indentations 32. Apertures 42 are also provided for allowing steam to rise therethrough. Handle 44 upstands from the body member 31 to facilitate handling in both the preparation and serving phases.

Still referring to FIG. 3, the stand 34 includes a generally cylindrical body section 46. The body section 46 is constructed with a plurality of legs 48, the bottoms 49 of which define a notional plane upon which the stand 34 may rest. A plurality of arcuate regions 50 separate individual legs 48. A circular resting surface 52 is provided for supporting the tray body 31 thereabove. As described in more detail below, the stand 34 facilitates the direct use of the tray 30 in a cooking vessel for steam cooking of the eggs. The stand 34 can be used to position the tray 30 above the water level within the cooking vessel for proper processing of the eggs received therein. It may be recognized that tray 30 can likewise be used for preparation of "soft-boiled" eggs. In this manner, the precise boiling time for all of the eggs can be controlled.

Referring now to FIG. 4, there is shown a side elevational, cross sectional view of the tray 30 disposed within a cooking vessel 60. The tray 30 is shown in a cross sectional configuration. In this configuration the mating engagement between the stand 34 and the body 31 of the tray 30 can be seen. Stand 34 has been placed in lower region of the cooking vessel 60 for positioning the tray 30 above the water level therein.

Still referring to FIG. 4, the cooking vessel 60 comprises a lid 62 and a pan 64. The pan 64, as shown herein, is located upon a burner 66 of a conventional stove 68. Water 70 placed in the vessel 64 is thus heated to produce steam which rises upwardly through the apertures and slits in the tray 30. Apertures 38 disposed within each indentation 32 are clearly shown for this purpose. The level of water 70 in the cooking vessel 64 is preferably beneath the bottom region 39. In this manner an egg 72 may be disposed within the cooking vessel for proper steaming and uniform heating.

Figure 5:
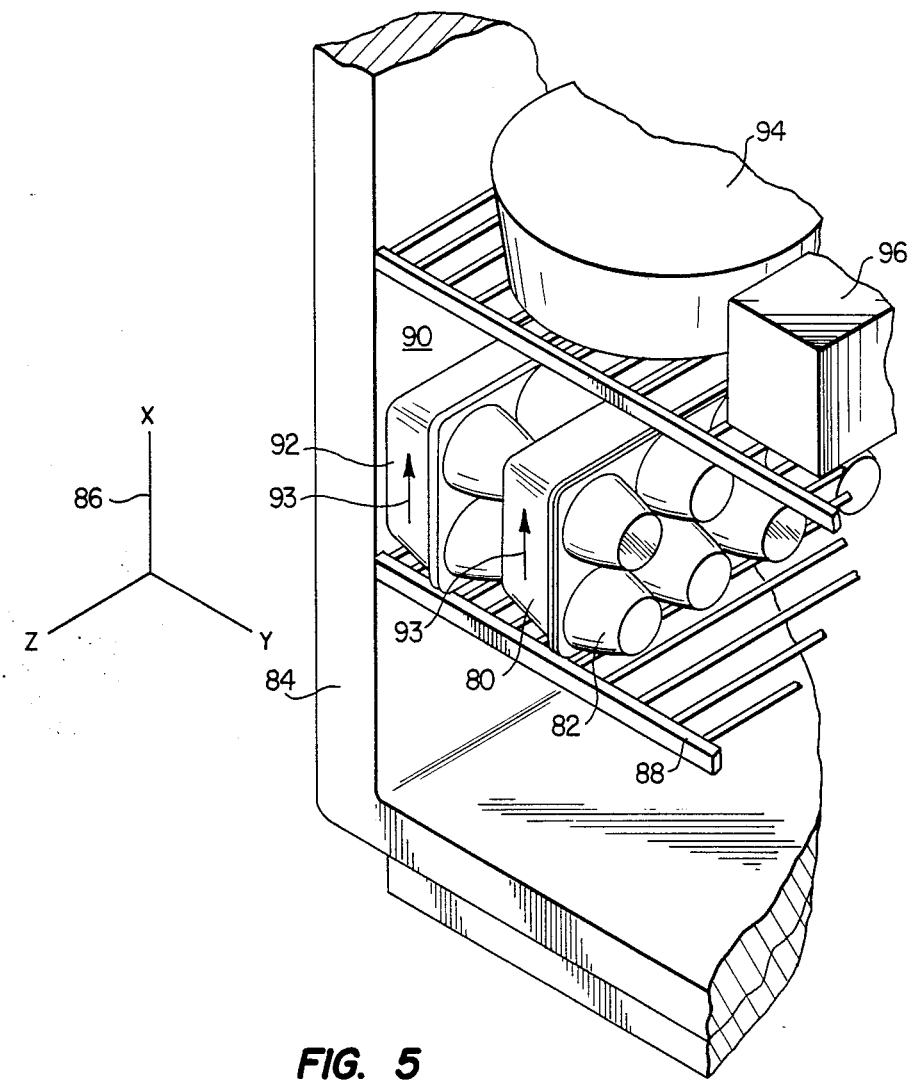
FIG. 5 is a perspective view of a method of storing raw eggs prior to preparation in accordance with the principles of the present invention.

Referring now to FIG. 5, there is shown an important step in the preparation of a whole deviled egg in accordance with the principles of the present invention. In this view, a conventional egg carton 80 is provided with egg compartments 82 shown depending therefrom. In this typical configuration, eggs are placed in the egg carton in a random fashion. Once set in the egg carton 80, the eggs seldom change their orientation. In accordance with the principles of the present invention, the egg cartons 80 are turned upon their side within a refrigerator 84. The orientation of each egg 12, represented by the x,y,z coordinate system 86, facilitates a select orientation of, and the proper positioning for the yolk 13 of each egg 12. This aspect will be described in more detail below.

Still referring to FIG. 5, the eggs are stored upon a rack 88 of the refrigerator 84. In this particular configuration the carton 80 is shown, although any container may be used. Carton 80 as shown is disposed contiguous an adjacent egg carton 92 against the side wall 90 of the refrigerator 84. This leaves ample room for other food items such as containers 94 and 96 shown herein for purposes of illustration. This particular storage position affords the user the opportunity to maintain the select orientation of the eggs 12 contained within each carton 80 and 92. As shown herein, the egg yolks 13 will be induced to rise to a defined side of each egg 12. By positioning the cartons 80 and 92 in the horizontal position shown, each egg 12 is, in effect, lying on its side. The egg yolk will thus orient itself under the influence of gravity along the x axis, and the egg yolk will rise close to the surface of the egg white. It is an ideal position for the yolk 13 to be centered along the y axis of the egg and exposed along the x axis against one side. In this position the egg yolk 13 may easily be seen and removed by the cutting implement of FIG. 1. The select orientation of each egg carton may be marked as illustrated by the indicia 93 placed on each carton. As the cartons are removed from the use of refrigerator, the orientation may be maintained through use of the indicia 93 in order to facilitate a quick location of the egg yolk 13 in each egg 12. For example, the cartons 80 and 92 may be opened and each egg marked before removing the eggs for heating.

In operation, the eggs 12 are stored in the refrigerator in accordance with FIG. 5 for one to two weeks before hard cooking. Very fresh eggs are almost impossible to peel and during this period of storage the thickness of the egg white relaxes to allow the yolk to rise to the top. In this way the indicia 93 thus indicates the side of the egg within the carton against which the egg yolk may be found. After storage the egg yolks 13 have been positioned where they are most easily removed and the eggs are ready to cook. Since steaming is the cleanest and the most reliable way to hard cook eggs, they are removed from the carton and positioned within the tray 30. Within the tray 30, each egg 12 is positioned within an indentation 32 and the tray is placed within a pan 64 shown in FIG. 4. The tray 30 is designed to fit inside conventional skillets, such as a 10" skillet or a Dutch oven. In the present configuration, the tray 30 holds up to 16 eggs and comes with a stand 34 which allows it to be set above the water line, if needed. Eggs 12 are less likely to crack while cooking if the initial cooking phase commences with the eggs at room temperature. It is possible, however, to use the steaming technique of the present invention without the necessity of the egg warming, since each egg is individually held within the conforming indentation 32. Once the eggs 12 are steam cooked and cooled, the egg shells may be removed and the egg yolks 13 then easily located. The egg yolk 13 is removed in accordance with the steps shown in FIG. 1. The deviled egg 20 shown in FIG. 2 may then be replaced back within the serving tray 30.

It is thus believed that the operation and construction of the present invention will be apparent from the foregoing description. While the method and apparatus shown or described has been characterized as being preferred it will be obvious that various changes and modifications may be made without departing from the spirit and scope of the invention as defined in the following claims.

I claim:

1. A method of preparing whole deviled eggs by removing a section of egg white through the penetration of a solidified white section of the egg to expose the egg yolk therewithin, said method comprising the steps of:

orienting the eggs on their sides for causing the yolks thereof to float to the top side thereof;

storing the oriented eggs in a refrigerated area for a sufficient period of time to facilitate egg yolk positioning on said top side;

steam cooking said eggs for solidifying the white section and the egg yolk therein, for facilitating the removal of said egg yolk therefrom;

peeling the egg shells from said eggs;

providing a cutting implement for the penetration of said egg and the exposure of said egg yolks therein;

forming said implement with arcuate bifurcated side wall portions;

providing said bifurcated side wall portions in a generally arcuate cross sectional configuration with a lower cutting edge formed thereacross and adapted for engaging and penetrating the whites of said eggs;

positioning said peeled eggs in a position to expose the egg yolk therein;

positioning said arcuately shaped cutting sections upon the surface of an adjacent egg yolk;

pressing said implement into said peeled egg;

flexing said bifurcated portions one toward the other for engaging said penetrated egg white of said peeled egg therebetween; and retracting said implement from said peeled egg and removing the penetrated egg white therefrom for subsequent refilling of said peeled egg with a mixture for comprising a deviled egg.

2. The method as set forth in claim 1 wherein said storage time is on the order of two weeks.

3. The method as set forth in claim 1 wherein the step of storing the oriented eggs in a refrigerated area includes the step of storing the eggs in a container in a refrigerator.

4. The method as set forth in claim 1 wherein the step of steam cooking said eggs includes the step of positioning said eggs in a tray exposed to steam from boiling water.

5. The method as set forth in claim 1 wherein the step of positioning said egg includes the step of locating the yolk of the egg adjacent the said top side thereof and exposing said top side to said cutting implement.

6. The method as set forth in claim 1 wherein said step of steam cooking said eggs includes the step of providing a tray having a plurality of indentations adopted for receipt of said eggs for said steam cooking and the step of placing said eggs within said tray.

7. The method as set forth in claim 6 wherein said indentations are formed with a planar bottom region and said method further includes the step of placing said deviled egg back into said indentations and flattening the bottoms of said deviled eggs to facilitate serving.

* * * * *